Oct. 26, 1926.
W. E. HARDIN
1,604,570
BRAKE
Filed Sept. 15, 1925
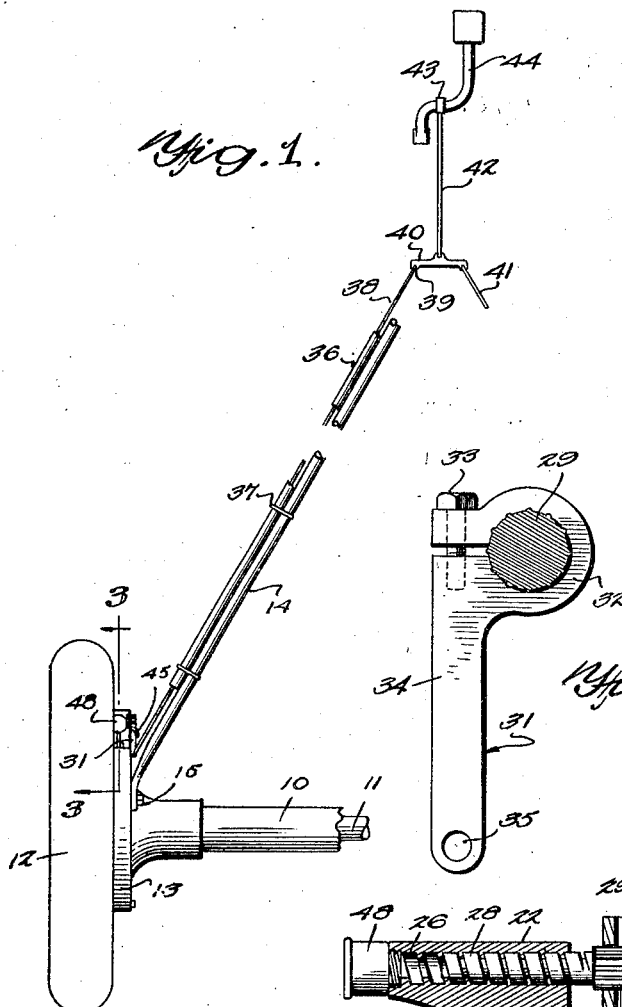
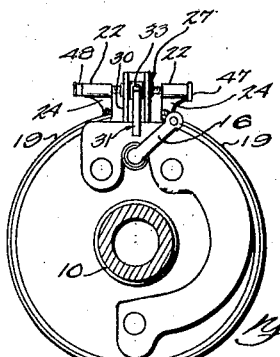
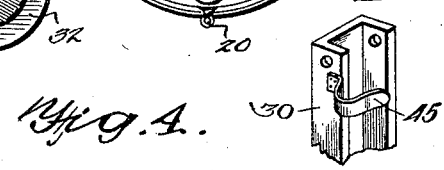
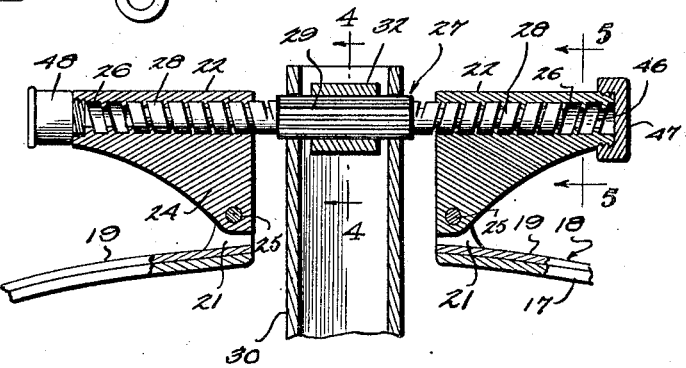
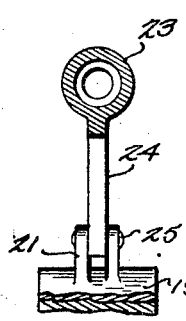
Inventor
William E. Hardin
By
Attorney Patented Oct. 26, 1926.

1,604,570

UNITED STATES PATENT OFFICE.

WILLIAM ENLA HARDIN, OF FORT WORTH, TEXAS.

BRAKE.

Application filed September 15, 1925. Serial No. 56,555.

This invention relates to brakes, and more particularly to a brake operating mechanism for automobile brakes.

An important object of the invention is to provide a brake operating mechanism which is strong and durable, and positive in action.

A further object is to provide a device of the above mentioned character wherein half the operating movement is transmitted to each end of a split brake band whereby the latter is clamped against opposite sides of the brake drum.

A further object is to provide a turn-buckle having threaded portions at opposite ends, each of which is adapted to engage internal threads of a member connected to one end of the brake band, means being provided for rotating the turn-buckle from a foot pedal or other operating lever.

Other objects and advantages of the invention will be apparent during the course of the following description.

In the accompanying drawings, I have shown one embodiment of the invention. In this showing:

Figure 1 is a fragmentary plan view of a portion of a motor vehicle showing the invention applied, Figure 2 is an inside face view of a brake drum and associated elements, Figure 3 is a section on line 3—3 of Figure 1, Figure 4 is a section on line 4—4 of Figure 3, Figure 5 is a section on line 5—5 of Figure 3, and Figure 6 is a detail perspective of the upper end of the bracket and the spring associated therewith.

Referring to the drawings, the numeral 10 designates a rear axle housing of a motor vehicle in which is rotatably mounted the usual axle 11 adapted to drive a rear wheel 12. A brake drum 13 is secured to the axle housing in the usual manner. In the present instance, I have illustrated a radius rod 14 bolted, as at 15, against the inner face of the brake drum. The brake drum may be provided with the usual internal expanding brake (not shown) adapted to be operated by the usual lever 16.

The brake drum is adapted to be gripped by an external contracting fabric brake 17 secured to the usual supporting band 18. The band 18 is preferably formed of complementary sections 19, the lower ends of which are pivotally connected to the drum, as at 20. The upper ends of the band sections 19 are provided with upwardly extending lips 21 for a purpose to be described.

Ears 22 are arranged above the lips 21, as shown in Figure 3. Each of these ears are shaped in cross section, as shown in Figure 5 and comprises an upper elongated substantially cylindrical portion 23 and a depending flat portion 24. The flat portions 24 are provided in their lower ends with openings to receive bolts 25 which pass through the lips 21. The cylindrical portions 22 of the ears are arranged in alinement with each other, and each is internally screw-threaded, as at 26. A turn-buckle, designated as a whole by the numeral 27, is provided on opposite ends with threaded portions 28 arranged in the internally threaded portions of the ears and the threaded portions of the turn-buckle are oppositely pitched, as will be apparent. The central portion 29 of the turn-buckle is fluted, as shown in Figures 3 and 4, and is adapted to be supported in a bracket 30, carried by the brake drum. The bracket 30 is substantially U-shaped in cross section, and the opposite sides of the bracket are adapted to embrace the central portion of the turn-buckle near the ends thereof.

An operating lever 31 is adapted to actuate the turn-buckle. The member 31 is provided at its upper end with a split cylindrical portion 32 provided with a clamping screw 33. The cylindrical portion 32 is internally grooved to correspond to the flutes of the turn-buckle. The operating member 31 is provided with a depending portion 34, which is offset from the turn-buckle, as shown in Figure 4, and is provided in its lower end with an opening 35.

In the present instance, I have shown a tube 36 secured, as at 37, to the radius rod 14, and an operating cable 38 extends through this tube. The rear end of the cable 38 is secured in the opening 35, as shown in Figure 1, and the forward end of the cable is secured, as at 39, to one end of an equalizing member 40. A similar cable 41 is also connected to the opposite end of the equalizing member and is adapted to be connected to a similar brake mechanism mounted on the other rear wheel of the vehicle (not shown). Another cable 42 is connected at its rear end to the equalizing member 40 centrally thereof, and the forward end of the cable 42 is connected, as at 43, to a brake pedal 44 or similar operating lever. Any suitable spring means may be employed for normally maintaining the lever 44 in inoperative position and a spring 45 as shown in Fig. 6, may be connected between the bracket 30 and the operating member 31 to maintain the latter in neutral position.

In Figure 3 of the drawings, I have shown alternate methods for maintaining lubricant within the ears 22. Each of the threaded portions 28 is shorter than the ear in which it operates to provide a lubricant space 46 which may be closed by a cap 47. If desired, a grease cup 48 of the usual construction may be employed for supplying the lubricant.

The operation of the device is as follows:

The spring 45 is adapted to maintain the operating member 31 in its normal or inoperative position, as shown in Figure 1. When in this position, the lever 31 will maintain the brake bands 17 out of contact with the brake drum, thus preventing any contracting action. Operation of the lever 44 is adapted to pull the cables 38 and 41 forwardly, and this action will rock each of the operating members 31 to swing them inwardly away from the brake drums. This action obviously will rotate each of the turn-buckles employed, thus moving the ears 22 inwardly and effectually clamping the brake bands about the drums. If desired, the screw 33 may be left sufficiently loose to permit a sliding action of the cylindrical portion 32, thus allowing the turn-buckle to assume any desired position to clamp opposite ends of the brake band equally against the brake drum. If it is found that the brake bands are accurately mounted, the screw 33 may be tightened. When the pedal 44 is released, the spring 45 will return the operating member to normal position, thus releasing the brake bands from the drum.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. A device of the character described comprising a brake band having adjacent relatively movable ends, members connected to said ends, and provided with alined oppositely threaded openings, a turn-buckle having oppositely threaded ends arranged in said openings, and an operating lever having a portion surrounding a portion of said turn-buckle, said lever being fixed against rotation with respect to said turn-buckle and slidable longitudinally thereon.

2. A device of the character described comprising a brake band having adjacent relatively movable ends, members connected to said ends and provided with alined oppositely threaded openings, a turn-buckle having oppositely threaded ends arranged in said openings, means for rotatably supporting said turn-buckle, the central portion of said turn-buckle being irregular in cross-section, a sleeve surrounding the central portion of said turn-buckle, said sleeve corresponding in shape to and being adapted to slide longitudinally on the central portion of said turn-buckle, and a lever arm carried by said sleeve.

3. A device of the character described comprising a brake band having adjacent relatively movable ends, members connected to said ends, and provided with alined oppositely threaded openings, a turn-buckle having oppositely threaded ends arranged in said openings, the central portion of said turn-buckle being other than round in cross section, a sleeve surrounding the central portion of said turn-buckle and corresponding in shape thereto, and a lever arm carried by said sleeve.

4. A device of the character described comprising a brake drum, a brake band surrounding said drum and having adjacent relatively movable ends, an ear pivotally connected to each end of said band, said ears being provided with alined internally threaded cylindrical portions, a turn-buckle having oppositely threaded ends arranged in said threaded openings, the central portion of said turn-buckle being fluted, and an operating lever having a cylindrical portion surrounding the central portion of said turn-buckle, said cylindrical portion having an internal shape corresponding to the shape of the fluted portion of said turn-buckle.

In testimony whereof, I affix my signature.

WILLIAM ENLA HARDIN.